United States Patent Office 3,168,554
Patented Feb. 2, 1965

3,168,554
STABILIZERS FOR PERACIDS
Benjamin Phillips, Charleston, Samuel W. Tinsley, South
Charleston, and Paul S. Starcher, Charleston, W. Va.,
assignors to Union Carbide Corporation, a corporation
of New York
No Drawing. Filed May 26, 1960, Ser. No. 31,797
4 Claims. (Cl. 260—502)

This invention relates to a method for stabilizing peracids. In one aspect this invention relates to a method for stabilizing peracetic acid. In another aspect this invention relates to the use of a pyridine-2-methanol, certain phosphorus compounds, and a mixture comprising certain phosphorus compounds and a pyridine-2-methanol, as stabilizers for peracids.

Peracetic acid, for example, has become quite important commercially within the last ten years, principally as a reagent for converting olefins into the corresponding epoxides. However, in situations where it is necessary to store peracetic acid for a period of time, the tendency of the acid to slowly decompose on storage, even at room temperature, can be a decided disadvantage. After fourteen weeks storage at room temperature, commercial grade, unstabilized peracetic acid has been observed to go from a peracetic acid content of about 40 percent to about 13 percent. This is obviously an important economic factor, and practical means for retarding this decomposition will have great utility.

It is believed that the decomposition reactions which occur on storage include the following free-radical reactions:

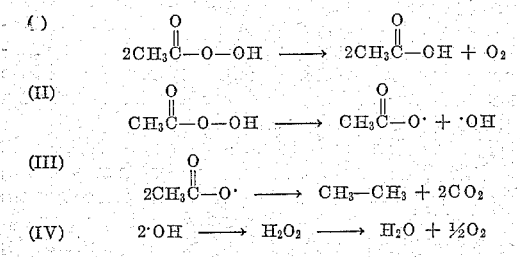

These, and other free-radical reactions, probably all take place. There is evidence that decomposition is catalyzed by very small amounts (traces) of heavy metals. Other foreign materials, such as dust, have also been found to increase the rate of decomposition. The trace amounts of foreign materials that are picked up when peracetic acid is prepared in metal equipment, or even in glass-lined equipment, is sufficient to reduce the stability of the acid.

In accordance with this invention, it has been discovered that the addition of minor amounts of certain substances to peracids greatly improves the storage stability of said peracids. It is likely that the stabilization is effected by the ability of said substances to suppress the catalytic power of the contaminants that promote decomposition. However, the exact mechanism by which the stabilization is effected is unknown, and it is to be understood that this invention is not limited by or restricted to any theory of action expressed herein.

The substances which have been found to have a stabilizing effect on peracids fall into four general groups.

Group (1) comprises the pyridine-2-methanols having

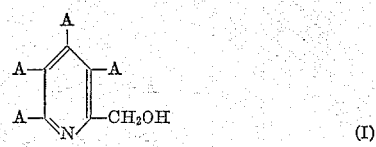

the formula:
wherein A represents a member selected from the group consisting of hydrogen atoms and X, and X represents a member selected from the group consisting of —COOH and —CH$_2$OH radicals, provided that only one A represents an X.

It has been discovered that when certain phosphorus compounds are employed as stabilizers for peracids in combination with a pyridine-2-methanol, as defined above, novel synergistic effects are obtained. Thus, Group (2) is a mixture comprising a pyridine-2-methanol as defined above and a member selected from the group consisting of the phosphoric acids, the alkali metal salts of the phosphoric acids, the alkyl acid esters of the phosphoric acids, the alkali metal salts of the alkyl acid esters of the phosphoric acids, and the alkaline earth metal salts of the alkyl acid esters of the phosphoric acids.

Group (3) comprises the long chain alkyl acid esters of orthophosphoric acid having the formula:

wherein each R individually represents a member selected from the group consisting of hydrogen atoms and alkyl radicals having from 1 to 20 carbon atoms, provided that at least one R represents a long chain alkyl radical having from 12 to 20 carbon atoms.

Group (4) comprises the long chain alkyl acid esters of pyrophosphoric acid having the formula:

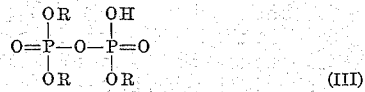

wherein each R individually represents a member selected from the group consisting of hydrogen atoms and alkyl radicals having from 1 to 20 carbon atoms, provided that at least one R represents a long chain alkyl radical having from 12 to 20 carbon atoms.

It is an object of this invention to provide a method for the stabilization of peracids. It is a further object of this invention to provide a method for the stabilization of peracetic acid. It is a still further object of this invention to provide a method for the stabilization of peracids which comprises adding to said acid a minor amount of a pyridine-2-methanol. A further object of this invention is to provide a method for the stabilization of peracids which comprises adding to said acid a mixture comprising a minor amount of pyridine-2-methanol and a minor amount of a phosphorus compound selected from the group consisting of the phosphoric acids, the alkali metal salts of the phosphoric acids, the alkyl acid esters of the phosphoric acids, the alkali metal salts of the alkyl acid esters of the phosphoric acids and the alkaline earth metal salts of the alkyl acid esters of the phosphoric acids. A still further object of this invention is to provide a method for the stabilization of peracids which comprises adding to said acid minor amounts of a long chain alkyl acid ester of orthophosphoric acid. A further object of this invention is to provide a method for the stabilization of peracids which comprises adding to said acid minor amounts of a long chain alkyl acid ester of pyrophosphoric acid. Other objects of the invention will become apparent to those skilled in the art upon examination of the detailed description which follows:

The pyridine-2-methanols which are effective as stabilizers for peracids are represented by the formula:

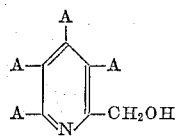

(I)

wherein A represents a member selected from the group consisting of hydrogen atoms and X, and X represents a member selected from the group consisting of —COOH and —CH$_2$OH radicals, provided that only one A represents an X. Thus, the Group (1) stabilizers are the pyridine-2-methanols that have either a —COOH radical or a —CH$_2$OH radical on one of the open positions on the ring, that is, on either the 3, 4, 5 or 6 position on the ring. Exemplary members include pyridine-2,6-dimethanol; pyridine-2-methanol-6-carboxylic acid; pyridine-2,4-dimethanol; pyridine-2-methanol-4-carboxylic acid; pyridine-2,5-dimethanol; pyridine-2-methanol-3-carboxylic acid, and the like. The preferred pyridine-2-methanols are those in which X is located on the 6 position on the ring, and therefore have the formula:

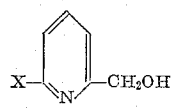

(IV)

wherein X is a member selected from the group consisting of —CH$_2$OH and —COOH radicals.

The stabilizers of Group (2) are mixtures comprising a pyridine-2-methanol as defined above and a member selected from one of the following five classes of phosphorus compounds:

(a) The phosphoric acids,
(b) The alkali metal salts of the phosphoric acids,
(c) The alkyl acid esters of the phosphoric acids,
(d) The alkali metal salts of the alkyl acid esters of the phosphoric acids, and
(e) The alkaline earth metal salts of the alkyl acid esters of the phosphoric acids.

(a) The term "the phosphoric acids" refers to the acids resulting from the reaction of phosphorus pentoxide (P$_2$O$_5$) with water. The formation of these acids is illustrated by the following equations:

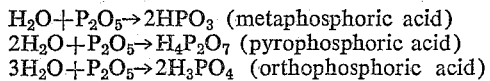

Also included are the polymetaphosphoric acids and the polyphosphoric acids. Exemplary members include metaphosphoric acid, orthophosphoric acid, pyrophosphoric acid, tetrametaphosphoric acid, pentametaphosphoric acid, hexametaphosphoric acid, tripolyphosphoric acid, tetrapolyphosphoric acid, octapolyphosphoric acid, and the like.

(b) The alkali metal salts of the phosphoric acids consists of the salts of orthophosphoric acid, pyrophosphoric acid, the polymetaphosphoric acids and the polyphosphoric acids, wherein at least one hydrogen atom has been replaced by an alkali metal. Examples include sodium dihydrogen phosphate, lithium dihydrogen phosphate, potassium dihydrogen phosphate, disodium hydrogen phosphate, trisodium phosphate, sodium hexametaphosphate, tetrasodium pyrophosphate, sodium tetrapolyphosphoric acid, disodium octapolyphosphoric acid, and the like. Preferred are the sodium salts of ortho-, pyro-, the polymeta-, and the polyphosphoric acids.

(c) The alkyl acid esters of the phosphoric acids are the partially esterified alkyl esters of orthophosphoric acid, pyrophosphoric acid and the polyphosphoric acids wherein said alkyl groups have from 1 to 20 carbon atoms. The partially esterified phosphoric acids may be prepared by the reaction of an alcohol with phosphorus pentoxide as, for example,

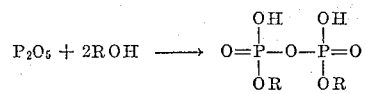

Other ratios of alcohol to phosphorus pentoxide will yield derivatives of meta-, ortho-, and polyphosphoric acids.

It will be apparent to one skilled in the art that an alkyl acid ester, or partially esterified alkyl ester, will have at least one acidic hydrogen atom in the molecule. Therefore, an alkyl acid ester of one of the phosphoric acids will always have the group

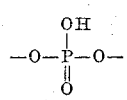

present in the molecule. Examples of the alkyl acid esters of the phosphoric acids that are contemplated by this invention include dimethyl dihydrogen pyrophosphate, dioctyl dihydrogen pyrophosphate, distearyl dihydrogen pyrophosphate, ethyl stearyl hydrogen orthophosphate, pentaoctyl dihydrogen pentapolyphosphate, diisopropyl hydrogen orthophosphate, and the like.

(d) The alkali metal salts of partially esterified phosphoric acids are the partially or completely neutralized compounds of (c), wherein at least one of the acidic hydrogens has been replaced with sodium, potassium, lithium, or other alkali metal. The commercially available product "Victawet 35" having the empirical formula Na$_5$R$_5$(P$_3$O$_{10}$)$_2$ (R=2-ethylhexyl) is of this type.

(e) The alkaline earth metal salts of the alkyl acid esters of the phosphoric acids are the calcium, barium, strontium, magnesium, etc., salts of the alkyl acid esters as defined above. Particularly preferred are the calcium salts of the alkyl acid esters of the polyphosphoric acids, such as calcium pentaoctyl pentapolyphosphate.

In addition, this invention contemplates two classes of phosphorus compounds that are useful as stabilizers for peracids. The first class is the long chain alkyl acid esters of orthophosphoric acid having the formula:

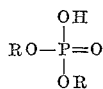

(II)

wherein each R individually represents a member selected from the group consisting of hydrogen atoms and alkyl radicals having from 1 to 20 carbon atoms, provided that at least one R represents a long chain alkyl radical having from 12 to 20 carbon atoms. Exemplary long chain alkyl acid esters of orthophosphoric acid include ethyl stearyl hydrogen orthophosphate, distearyl hydrogen orthophosphate, dilauryl hydrogen orthophosphate, methyl cetyl hydrogen orthophosphate, dimyristyl hydrogen orthophosphate, stearyl dihydrogen orthophosphate, dieicosyl hydrogen orthophosphate, and the like. The preferred long chain alkyl acid esters of orthophosphoric acid are those in which the long chain alkyl radicals are stearyl radicals.

The second class of phosphorus compounds are the long chain alkyl acid esters of pyrophosphoric acid having the formula:

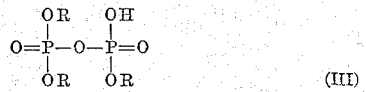 (III)

wherein each R individually represents a member selected from the group consisting of hydrogen atoms and alkyl radicals having from 1 to 20 carbon atoms, provided that at least one R represents a long chain alkyl radical having from 12 to 20 carbon atoms. Examples of long chain alkyl acid esters of pyrophosphoric acid include distearyl dihydrogen pyrophosphate, methyl stearyl dihydrogen pyrophosphate, dilauryl dihydrogen pyrophosphate, myristyl trihydrogen pyrophosphate, butyl dicetyl hydrogen pyrophosphate, dieicosyl dihydrogen pyrophosphate, and the like. The preferred long chain alkyl acid esters of pyrophosphoric acid are those in which the long chain alkyl radicals are stearyl radicals.

The amount of stabilizer employed is not necessarily critical. The beneficial effects are observed in stabilizer concentrations as low as 0.0005 percent, based on weight of peracid, and lower, up to concentrations as high as 5.0 percent based on weight of peracid, and higher. The preferred concentration range is from about 0.05 percent to about 1.0 percent, based on weight of peracid.

Where the stabilizer is a mixture comprising a pyridine-2-methanol and one of the phosphorus compounds falling in Group (2), the concentrations are not critical, and both components individually can be employed in concentrations varying from about 0.0005 percent to about 5 percent, based on weight of peracid. The preferred concentration of both components individually is from about 0.02 percent to about 1 percent, based on the weight of peracid.

The stabilizers provided by this invention are effective as stabilizers for organic peracids such as peracetic acid, perbutyric acid, perbenzoic acid, monoperphthalic acid, and particularly for the unsubstituted aliphatic monocarboxylic peracids having from 2 to 4 carbon atoms, such as peracetic acid, perpropionic acid and perbutyric acid. It is preferred that these stabilizers be employed with peracetic acid or perpropionic acid. Highly preferred is peracetic acid.

The stabilizers are effective over the whole useful temperature range of the peracids with which they are employed. This corresponds generally to a range of from about −50° C. to about 150° C. The stabilizers are also effective at sub-atmospheric, super-atmospheric and atmospheric pressure.

The beneficial effects of the stabilizers are found at all useful concentrations of peracids in any of the common solvents. Thus, the stabilizers are effective at concentrations of peracids varying from about 5 percent to about 90 percent by weight, based on total weight of the solution. The stabilizers are particularly useful in peracid concentrations of from about 10 percent to about 70 percent, based on total weight of the solution. Highly preferred concentrations of peracid are from about 30 percent to about 60 percent, based on total weight of solution.

The solvents that can be employed to dissolve the peracids include acetic acid, propionic acid, butyric acid, water, acetone, dioxane, diethyl ether, chloroform, benzene, toluene, ethyl acetate, butyl acetate, hydrogen peroxide, mixtures thereof, and the like.

The following non-limiting examples illustrate the effectiveness of the stabilizers provided by this invention as stabilizers for peracetic acid.

In these experiments, the peracetic acid was dissolved in acetic acid. The containers used were 4-ounce glass-stoppered bottles for the room temperature (23° C.) tests, and 30 x 200 mm. test tubes connected to 8-inch air condensers for the elevated temperature (50–80° C.) tests. Because of the sensitivity of the peracetic acid stability to small amounts of impurities (i.e., even dust), all of the glassware was carefully cleaned with soap and water, cleaning solution, distilled water and finally with reagent grade acetic acid.

Approximately 60 ml. of peracetic acid of about 30–40 percent (by weight) concentration was used in each test. To this amount of peracid solution was added the stabilizer and the samples were stoppered and allowed to stand at room temperature in the dark (bench cabinet). For the higher temperatures, the test tubes equipped with air condensers were immersed in a water bath and kept in diffused light. Samples were withdrawn at regular intervals (a week or longer for room temperature studies down to a few hours in the 80° C. studies) and analyzed for peracetic acid content. The pipettes used for sampling were carefully cleaned before use and between sampling different bottles. The final result in each case is reported in the tables which follow.

The peracetic acid content can be determined, for example, by introducing 1–1.5 grams of the sample into a flask containing 60 milliliters of 50 weight percent aqueous sulfuric acid solution and five milliliters of a saturated aqueous potassium iodide solution. The flask is swirled to mix the solutions and then immediately titrated with a 0.1 N aqueous sodium thiosulfate solution to a colorless endpoint. If desired, a little starch can be added to the flask in order to accentuate the color of the iodine that is liberated when the peracetic acid reacts with the potassium iodide. From the titration data thus obtained, a determination of the peracetic acid content can be made.

*Examples 1–10*

These examples illustrate the synergistic effect obtained when using a pyridine-2-methanol in a mixture with the phosphorus compounds falling in Group (2).

| Ex. | Stabilizers (percent based on weight of peracetic acid) | Storage | | Percent Peracetic Acid | | |
|---|---|---|---|---|---|---|
| | | Time | Temperature, °C. | Initial | Final | Control—No Stabilizer |
| 1 | 0.1% pyridine-2, 6-dimethanol. | 13.75 days | 50 | 43.7 | 21.8 | 13.5 |
| 2 | 0.1% pyridine-2, 6-dimethanol plus 0.1% sodium hexametaphosphate. | 13.75 days | 50 | 43.7 | 26.6 | 13.5 |
| 3 | 0.1% pyridine-2, 6-dimethanol plus 0.1% dioctyl dihydrogen pyrophosphate. | 13.75 days | 50 | 43.7 | 22.4 | 13.5 |
| 4 | 0.1% pyridine-2, 6-dimethanol plus 0.1% distearyl dihydrogen pyrophosphate. | 13.75 days | 50 | 43.7 | 22.4 | 13.5 |
| 5 | 0.1% distearyl dihydrogen pyrophosphate. | 13.75 days | 50 | 43.7 | 18.5 | 13.5 |
| 6 | 0.1% pyridine-2, 6-dimethanol. | 44 weeks | 23 | 43.7 | 8.1 | 1.1 |
| 7 | 0.1% pyridine-2, 6-dimethanol plus 0.1% sodium hexametaphosphate. | 44 weeks | 23 | 43.7 | 29.0 | 1.1 |
| 8 | 0.1% sodium hexametaphosphate. | 69.9 hours | 80 | 46.4 | 7.3 | 1.7 |
| 9 | 0.1% pyridine-2, 6-dimethanol. | 64.5 hours | 80 | 46.4 | 16.9 | 4.7 |
| 10 | 0.1% pyridine-2, 6-dimethanol plus 0.1% sodium hexametaphosphate. | 64.5 hours | 80 | 46.4 | 17.3 | 4.7 |

Examples 11–21

These examples further illustrate the effectiveness of the pyridine-2-methanols in mixtures with phosphorus compounds as stabilizers for peracetic acid.

| Ex. | Stabilizers (percent based on weight of peracetic acid) | Storage | | Percent Peracetic Acid | | |
|---|---|---|---|---|---|---|
| | | Time | Temperature, °C. | Initial | Final | Control—No Stabilizer |
| 11 | 0.1% pyridine-2,6-dimethanol. | 14 days | 50 | 43.7 | 24.7 | 14.4 |
| 12 | 0.1% pyridine-2,6-dimethanol plus 0.1% sodium hexametaphosphate. | 14 days | 50 | 43.7 | 32.3 | 14.4 |
| 13 | 0.1% pyridine-2,6-dimethanol. | 44 hours | 80 | 46.4 | 12.4 | 2.2 |
| 14 | 0.1% pyridine-2-methanol-6-carboxylic acid. | 44 hours | 80 | 46.4 | 8.3 | 2.2 |
| 15 | 0.1% pyridine-2,6-dimethanol. | 64.5 hours | 80 | 46.4 | 16.9 | 4.7 |
| 16 | 0.1% pyridine-2,6-dimethanol plus 0.1% "Victawet 35B". | 64.5 hours | 80 | 46.4 | 11.2 | 4.7 |
| 17 | 0.1% pyridine-2,6-dimethanol plus 0.1% tetrasodium pyrophosphate. | 64.5 hours | 80 | 46.4 | 12.6 | 4.7 |
| 18 | 0.1% pyridine-2,6-dimethanol plus 0.1% dioctyl dihydrogen pyrophosphate. | 64.5 hours | 80 | 46.4 | 18.4 | 4.7 |
| 19 | 0.1% pyridine-2,6-dimethanol plus 0.1% sodium hexametaphosphate. | 64.5 hours | 80 | 46.4 | 17.3 | 4.7 |
| 20 | 0.1% pyridine-2,6-dimethanol plus 0.1% distearyl dihydrogen pyrophosphate. | 64.5 hours | 80 | 46.4 | 18.4 | 4.7 |
| 21 | 0.1% pyridine-2,6-dimethanol plus 0.1% ethyl stearyl hydrogen orthophosphate. | 64.5 hours | 80 | 46.4 | 13.3 | 4.7 |

Examples 22–31

These experiments illustrate the effectiveness of the compounds falling in Groups (3) and (4) as stabilizers for peracetic acid.

| Ex. | Stabilizers (percent based on weight of peracetic acid) | Storage | | Percent Peracetic Acid | | |
|---|---|---|---|---|---|---|
| | | Time | Temperature, °C. | Initial | Final | Control—No Stabilizer |
| 22 | 0.01% distearyl dihydrogen pyrophosphate. | 14 weeks | 23 | 41.5 | 24.0 | 13.95 |
| 23 | 0.1% distearyl dihydrogen pyrophosphate. | 14 weeks | 23 | 41.5 | 34.3 | 13.95 |
| 24 | 0.5% distearyl dihydrogen pyrophosphate. | 14 weeks | 23 | 41.5 | 30.9 | 13.95 |
| 25 | 1.0% distearyl dihydrogen pyrophosphate. | 14 weeks | 23 | 41.5 | 33.3 | 13.95 |
| 26 | 2.5% distearyl dihydrogen pyrophosphate. | 14 weeks | 23 | 41.5 | 25.9 | 13.95 |
| 27 | 5.0% distearyl dihydrogen pyrophosphate. | 14 weeks | 23 | 41.5 | 20.9 | 13.95 |
| 28 | 0.01% ethyl stearyl hydrogen orthophosphate. | 14 weeks | 23 | 41.5 | 26.6 | 13.95 |
| 29 | 0.1% ethyl stearyl hydrogen orthophosphate. | 14 weeks | 23 | 41.5 | 30.5 | 13.95 |
| 30 | 0.5% ethyl stearyl hydrogen orthophosphate. | 14 weeks | 23 | 41.5 | 26.55 | 13.95 |
| 31 | 1.0% ethyl stearyl hydrogen orthophosphate. | 14 weeks | 23 | 41.5 | 27.15 | 13.95 |

What is claimed is:

1. A stabilized organic peracid selected from the group consisting of perbenzoic acid, monoperphthalic acid, and the unsubstituted aliphatic monocarboxylic peracids having from 2 to 4 carbon atoms, wherein said organic peracid contains a small amount of a pyridine-2-methanol of the formula:

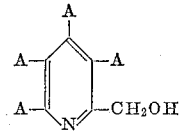

wherein A represents a member of the group consisting of hydrogen and X, and wherein X represents a member selected from the group consisting of carboxylic acid groups and hydroxymethyl groups, provided that only one A represents an X.

2. A stabilized aliphatic monocarboxylic peracid having from 2 to 4 carbon atoms, which contains from 0.0005 weight percent to 5 weight percent, based on weight of said aliphatic monocarboxylic peracid, of a pyridine-2-methanol of the formula:

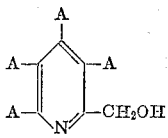

wherein A represents a member of the group consisting of hydrogen and X, and wherein X represents a member selected from the group consisting of carboxylic acid groups and hydroxymethyl groups, provided that only one A represents an X.

3. A stabilized peracetic acid which contains from 0.0005 weight percent to 5 weight percent, based on weight of said peracetic acid, of a pyridine-2-methanol having the formula

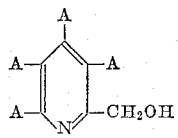

wherein A represents a member selected from the group consisting of hydrogen atoms and X, and wherein X represents a member selected from the group consisting of carboxylic acid groups and hydroxymethyl groups, provided that only one A represents an X.

4. A stabilized peracetic acid which contains from 0.0005 weight percent to 5 weight percent, based on weight of said peracetic acid, of pyridine-2,6-dimethanol.

References Cited in the file of this patent

UNITED STATES PATENTS

| 2,590,856 | Greenspan et al. | Apr. 1, 1952 |
| 2,609,391 | Greenspan et al. | Sept. 2, 1952 |
| 2,624,655 | Greenspan et al. | Jan. 6, 1953 |
| 2,953,572 | Dunn et al. | Sept. 20, 1960 |
| 3,043,658 | Banfield | July 10, 1962 |
| 3,053,633 | Dunlop et al. | Sept. 11, 1962 |

OTHER REFERENCES

Phillips et al.: "Journal or Organic Chemistry," vol. 23, pages 1823–1826, January 21, 1959.